(12) United States Patent
Eaton et al.

(10) Patent No.: US 8,047,408 B2
(45) Date of Patent: Nov. 1, 2011

(54) DISPENSER FOR GRANULES AND POWDERS

(75) Inventors: Edward T. Eaton, Eola, IL (US); Eric W. Larson, Pecatonica, IL (US); Brian W. Mathews, Waterman, IL (US); Robert Long, Glenview, IL (US)

(73) Assignee: Prince Castle LLC, Carol Stream, IL (US)

( * ) Notice: Subject to any disclaimer, the term of this patent is extended or adjusted under 35 U.S.C. 154(b) by 737 days.

(21) Appl. No.: 12/174,758

(22) Filed: Jul. 17, 2008

(65) Prior Publication Data
US 2010/0012684 A1 Jan. 21, 2010

(51) Int. Cl.
*G01F 11/10* (2006.01)
(52) U.S. Cl. .......................... 222/370; 222/410
(58) Field of Classification Search .................. 222/410, 222/411, 367, 370
See application file for complete search history.

(56) References Cited

U.S. PATENT DOCUMENTS

| | | | |
|---|---|---|---|
| 217,628 A * | 7/1879 | Marks et al. .................. | 222/168 |
| 480,146 A * | 8/1892 | Souder .......................... | 222/239 |
| 1,892,992 A * | 1/1933 | Moran et al. .................. | 222/181.1 |
| 2,211,452 A * | 8/1940 | Bowman ........................ | 222/429 |
| 2,584,781 A * | 2/1952 | Brook ............................ | 222/362 |
| 2,944,707 A * | 7/1960 | Steinmetz ...................... | 222/254 |
| 3,211,334 A * | 10/1965 | McShea ......................... | 222/39 |
| 3,522,902 A * | 8/1970 | Katz .............................. | 222/370 |
| 3,587,671 A | 6/1971 | Gamberini | |
| 3,592,368 A * | 7/1971 | Huette ........................... | 222/410 |
| 3,730,659 A | 5/1973 | Smith et al. | |
| 3,750,912 A | 8/1973 | Miels et al. | |
| 3,776,430 A | 12/1973 | Grandrud | |
| 3,991,908 A * | 11/1976 | Thomas et al. ................ | 221/154 |
| 4,020,865 A | 5/1977 | Moffat et al. | |
| 4,020,980 A * | 5/1977 | Illes, Jr. ......................... | 222/411 |
| 4,139,195 A | 2/1979 | Dreesen et al. | |
| 4,144,989 A | 3/1979 | Joy | |
| 4,147,166 A | 4/1979 | Hansen | |
| 4,240,569 A | 12/1980 | Bessinger | |
| 4,280,639 A | 7/1981 | Lemaitre | |
| 4,420,394 A | 12/1983 | Lewis | |
| 4,582,225 A | 4/1986 | Peden et al. | |
| 4,626,119 A | 12/1986 | Ladd, Jr. | |
| 4,629,093 A | 12/1986 | Le Molaire | |
| 4,630,954 A | 12/1986 | Ladd, Jr. | |
| 4,647,240 A | 3/1987 | Ladd, Jr. et al. | |
| 4,671,690 A | 6/1987 | Ladd, Jr. et al. | |
| 4,699,537 A | 10/1987 | Cook, Jr. | |
| 4,722,460 A | 2/1988 | Madsen | |
| 4,728,211 A | 3/1988 | Ladd, Jr. | |

(Continued)

*Primary Examiner* — Kevin P Shaver
*Assistant Examiner* — Donnell Long
(74) *Attorney, Agent, or Firm* — Kelly & Krause, L.P.; Joseph P. Krause

(57) ABSTRACT

A gravity-fed, manually-operable dispenser for sugar, creamer and other particles and granules is comprised of a particulate reservoir affixed to a dispensing base by engagement tabs and slots. The tabs and slots allow the dispenser to be easily disassembled for maintenance and cleaning. The base encloses a substantially cylindrical rotating measuring/dispensing vane that has several hollow apertures into which particulates flow from the reservoir. The vane rides on a smooth, flat surface that seals or closes off the apertures. An opening in the flat surface of the dispensing base allows particulates in a full aperture to fall through and out of the base. A soft gasket over surfaces of the vane that would otherwise make direct contact with the base portion prevent the vane from becoming lodged in place by crystalline material.

12 Claims, 10 Drawing Sheets

U.S. PATENT DOCUMENTS

| | | | |
|---|---|---|---|
| 4,790,981 A | 12/1988 | Mayer et al. | |
| 4,811,869 A | 3/1989 | Tremblay | |
| 4,832,235 A * | 5/1989 | Palmer | 222/370 |
| 4,848,597 A | 7/1989 | Bishell et al. | |
| 4,878,602 A | 11/1989 | Weigelt | |
| 4,906,120 A | 3/1990 | Sekiguchi et al. | |
| 5,082,148 A | 1/1992 | Dunning | |
| 5,169,036 A | 12/1992 | Tong | |
| 5,180,080 A | 1/1993 | Geschwender | |
| 5,222,635 A | 6/1993 | Chamo | |
| 5,261,432 A | 11/1993 | Sandrin | |
| 5,419,071 A | 5/1995 | Fatica | |
| 5,513,630 A | 5/1996 | Century | |
| 5,529,221 A * | 6/1996 | Roy | 222/181.2 |
| 5,542,411 A | 8/1996 | Rex | |
| 5,542,412 A | 8/1996 | Century | |
| 5,546,932 A | 8/1996 | Galli | |
| 5,570,686 A | 11/1996 | Century | |
| 5,613,624 A | 3/1997 | Grzybowski et al. | |
| 5,725,131 A | 3/1998 | Bell et al. | |
| 5,758,801 A | 6/1998 | Roling et al. | |
| 5,758,803 A | 6/1998 | Liao et al. | |
| 5,794,613 A | 8/1998 | Piskorski | |
| 6,029,661 A | 2/2000 | Whaley et al. | |
| 6,053,436 A | 4/2000 | Morford | |
| 6,079,112 A | 6/2000 | Love | |
| 6,119,688 A | 9/2000 | Whaley et al. | |
| 6,176,238 B1 | 1/2001 | McDerment | |
| 6,176,397 B1 | 1/2001 | Robbins et al. | |
| 6,179,164 B1 | 1/2001 | Fuchs | |
| 6,293,440 B1 | 9/2001 | Weaver | |
| 6,325,113 B1 | 12/2001 | Hathaway et al. | |
| 6,382,470 B1 | 5/2002 | Hu et al. | |
| 6,415,990 B1 | 7/2002 | Kiplinger | |
| 6,450,372 B1 | 9/2002 | Defontaine | |
| 6,457,891 B1 | 10/2002 | Bredacts | |
| 6,467,656 B1 | 10/2002 | Nagayanagi | |
| 6,470,745 B1 | 10/2002 | Reay et al. | |
| 6,558,061 B2 | 5/2003 | Petit | |
| 6,591,832 B1 | 7/2003 | DeJonge | |
| 6,712,539 B2 | 3/2004 | Richard et al. | |
| 6,748,986 B2 | 6/2004 | Chamba | |
| 6,871,762 B1 | 3/2005 | Cripps | |
| 6,966,468 B2 | 11/2005 | McKay et al. | |
| 7,048,149 B1 | 5/2006 | Lassota | |
| 7,347,639 B2 | 3/2008 | Dieudonat et al. | |
| 2002/0141807 A1 | 10/2002 | Bredacts | |
| 2002/0181998 A1 | 12/2002 | Petit | |
| 2003/0071061 A1 | 4/2003 | Lassota | |
| 2003/0159751 A1 | 8/2003 | Chamba | |
| 2004/0018039 A1 | 1/2004 | Richard et al. | |
| 2004/0140240 A1 | 7/2004 | Ricotti | |
| 2004/0217138 A1 | 11/2004 | McKay et al. | |
| 2005/0229862 A1 | 10/2005 | Dirle et al. | |
| 2006/0127164 A1 | 6/2006 | Dieudonat et al. | |
| 2006/0130869 A1 | 6/2006 | King | |
| 2007/0020026 A1 | 1/2007 | Dieudonat | |
| 2007/0131707 A1 | 6/2007 | Poole et al. | |
| 2007/0181613 A1 | 8/2007 | Ben-Shlomo et al. | |
| 2007/0290003 A1 | 12/2007 | Morin et al. | |

* cited by examiner

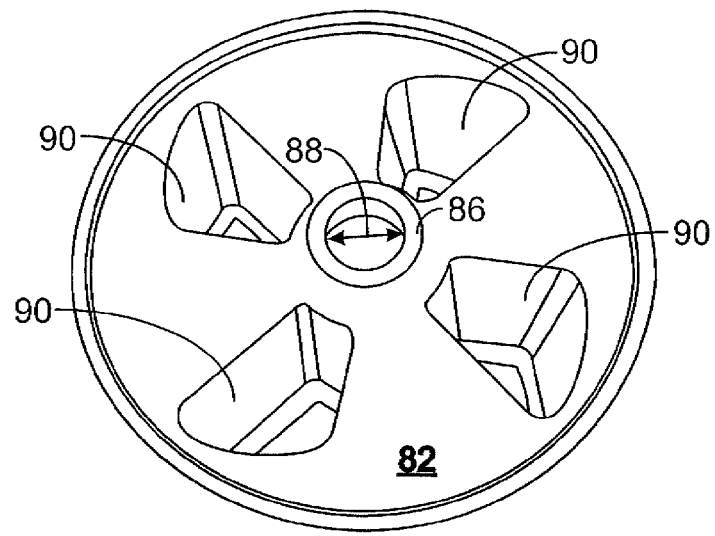
FIG. 5D
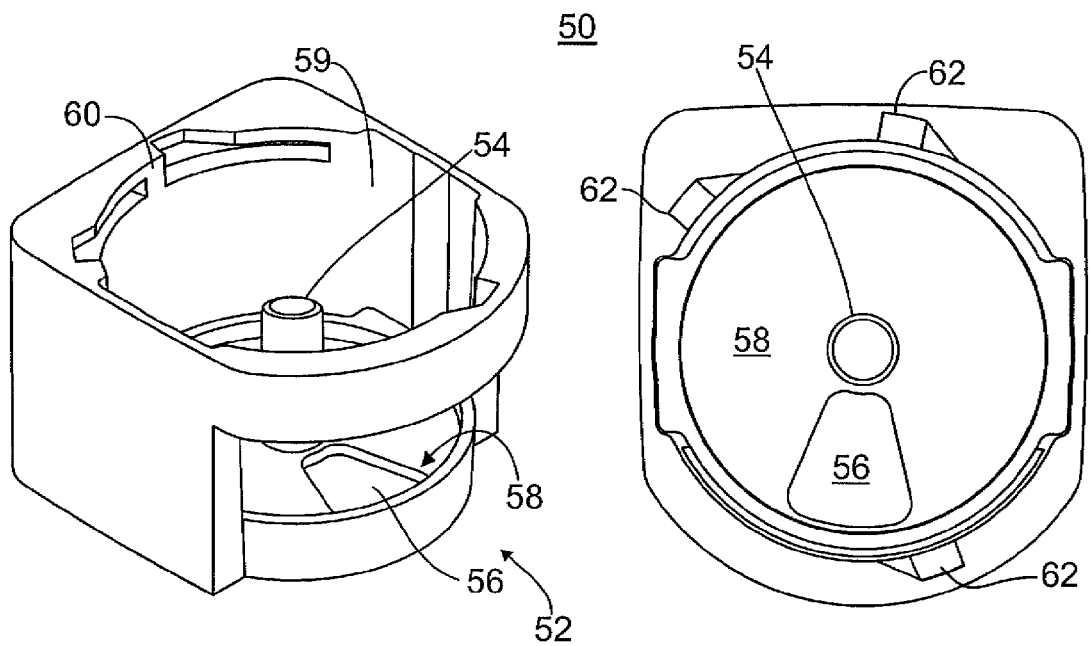
FIG. 6
FIG. 7

DISPENSER FOR GRANULES AND POWDERS

BACKGROUND

Many restaurants that provide coffee and other beverages to customers also provide stand-alone serving stations where customers can add sweeteners and/or creamer to beverages. Individual serving, pre-packaged sweeteners and creamers are expensive and messy. They are also subject to loss or theft. Many restaurants thus prefer to offer their customers sweeteners and creamers from dispensers that are filled and re-filled from bulk quantities.

Providing sweeteners and creamers and other particulates to customers in bulk powder granule dispensers creates a number of problems. Prior art dispensers are expensive to manufacture because many of them require complicated machinery and/or complicated housings. Prior art dispensers are also somewhat complicated to use and they are not readily cleaned or maintained, which is essential for restaurant use. A powder/granule dispenser that is simple to manufacture, simple to operate, reliable and easy to clean and maintain would be an improvement over prior art particulate dispensers.

BRIEF DESCRIPTION OF THE DRAWINGS

FIG. 5D is a perspective view of the top of the measuring/dispensing vane;

FIG. 6 is a perspective view of the dispensing base portion;

FIG. 7 is a top view of the base portion shown in FIG. 6;

DETAILED DESCRIPTION

Figure 1:
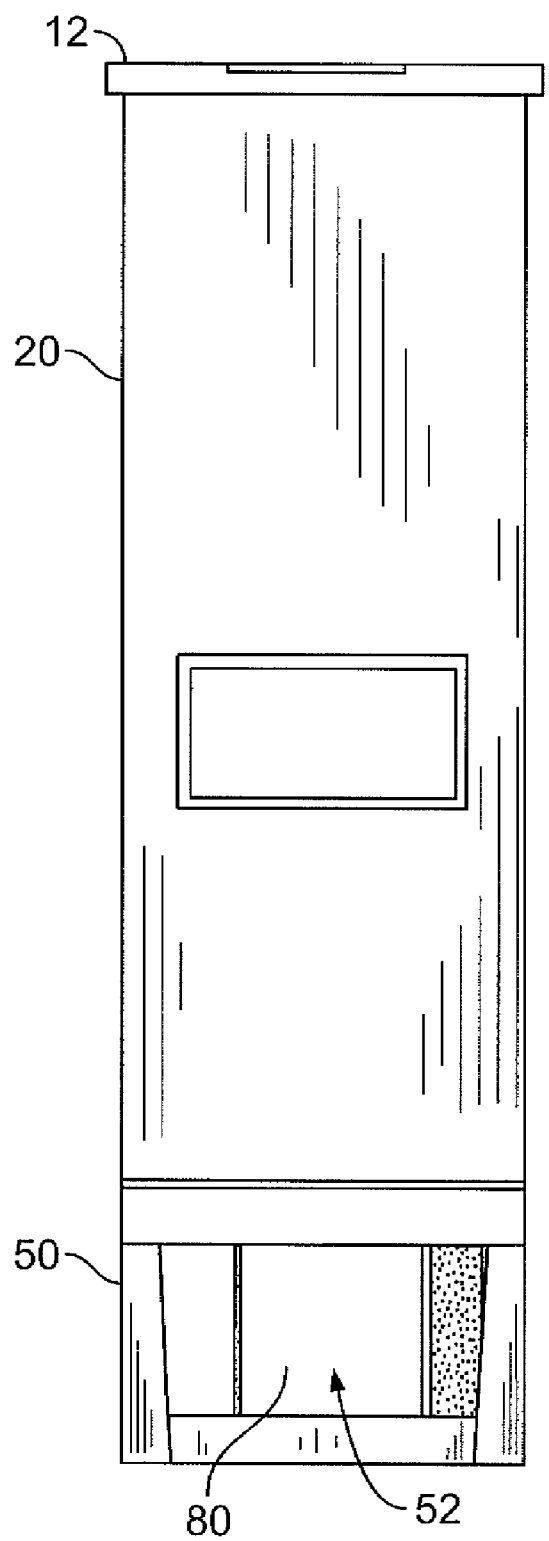
FIG. 1 is a front view of the particle dispenser for granules, also referred to herein as a particulate dispenser showing the particulate reservoir, the dispensing base portion and the measuring/dispensing vane.
Figure 2:
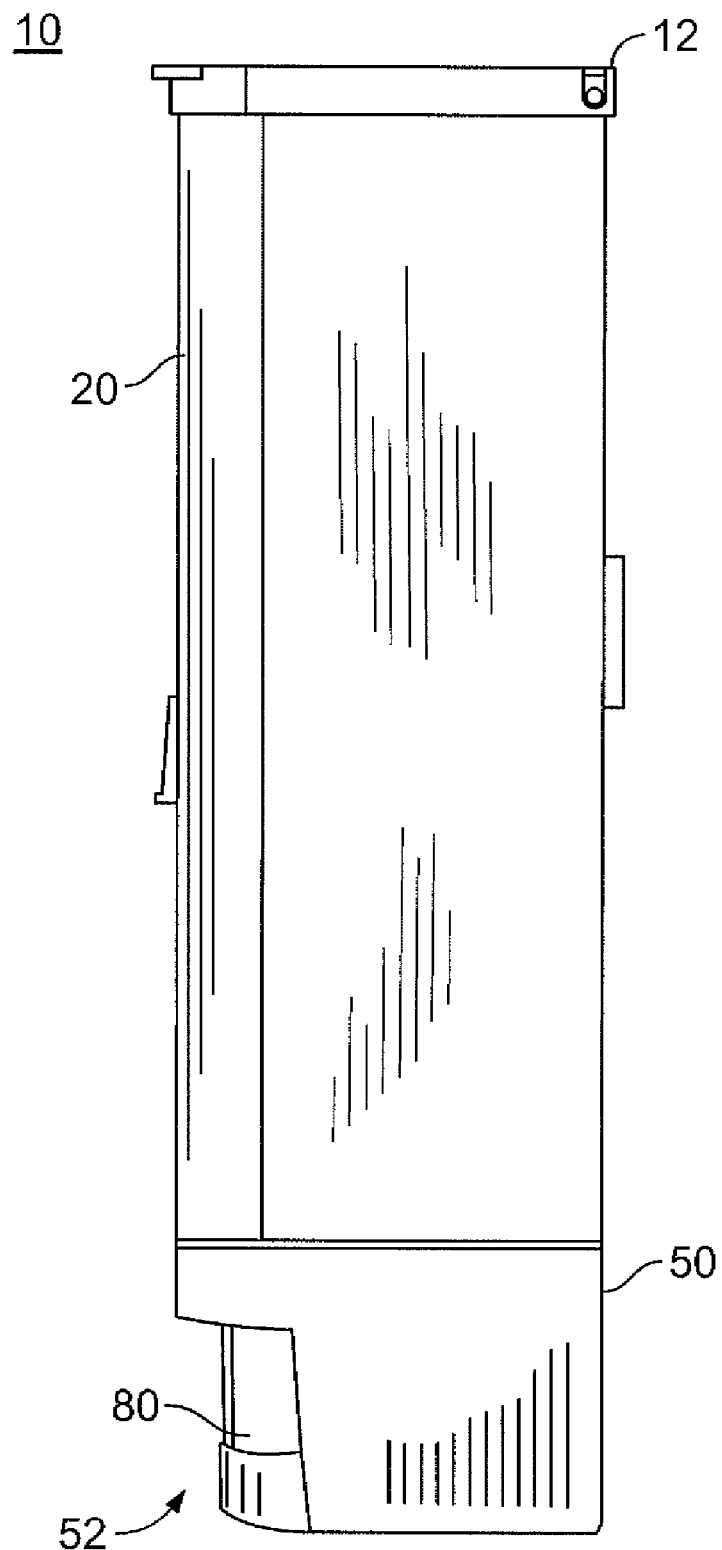
FIG. 2 is a side view of the particulate dispenser shown in FIG. 1.
Figure 3:
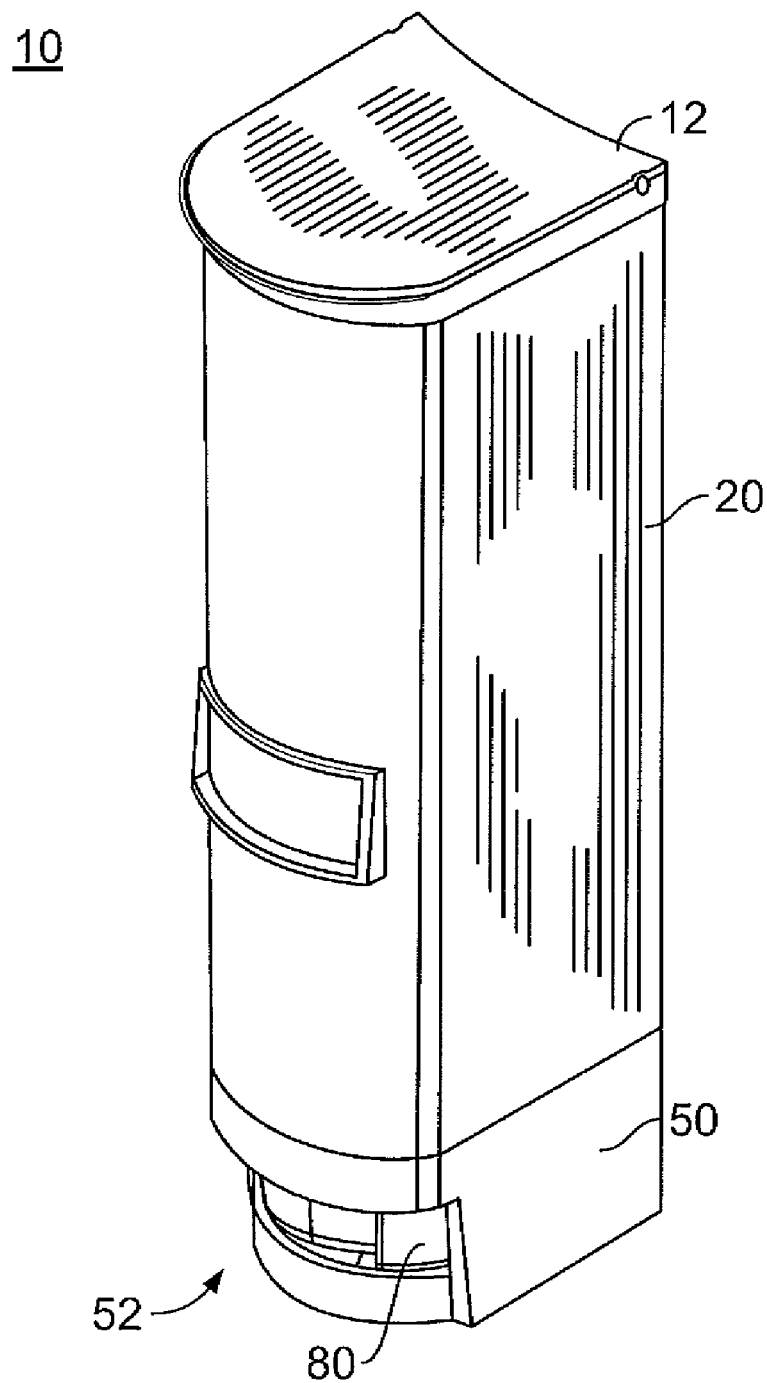
FIG. 3 is a perspective view of the particulate dispenser shown in FIG. 1 and FIG. 2.

FIG. 1 is a front view of a particulate dispenser 10, for dispensing measured amounts of particulates or granules, such as sugar or artificial sweeteners, coffee creamers and the like. FIG. 2 is a side view of the particulate dispenser 10 shown in FIG. 1. FIG. 3 is a perspective view of the dispenser 10 shown in FIGS. 1 and 2.

The dispenser 10 is comprised of essentially three components: an elongated reservoir 20 that holds particulates to be dispensed, a particulate-dispensing base portion 50 that is detachable from the reservoir 20, and a manually-operable rotating measuring/dispensing vane 80 that rotates within the base portion 50. The cover 12 acts to keep foreign objects out of the reservoir 20.

A window 52 is formed into the base portion 50 to allow a person to rotate the measuring/dispensing vane 80 using a finger. Rotating the vane 80 causes a fixed volume of a particulate in the reservoir 20 to be dispensed from a hole (not shown in FIG. 1, 2 or 3) at the bottom of the base portion 50. Continued rotation of the measuring/dispensing vane 80 causes additional fixed amounts of particulate to be dispensed. A user can thus dispense multiple, fixed amounts of particulate such as sugar or coffee creamer into a beverage container simply by rotating the vane 80 using a thumb or finger.

The dispenser 10 and its elongated reservoir 20 can be mounted on a wall or on a free-standing support (not shown) so that the dispenser 10 is held upright or vertically, as shown in FIG. 1 and FIG. 2. The reservoir 20 is formed to have an open top and, when the dispenser is upright as shown, the reservoir 20 can be repeatedly re-filled by removing or opening the cover 12 and refilling the reservoir 20. The cover 12 is considered to be openable in that it can be hingedly attached to the reservoir or snapped into place to facilitate its removal thereby opening the reservoir.

Figure 4:
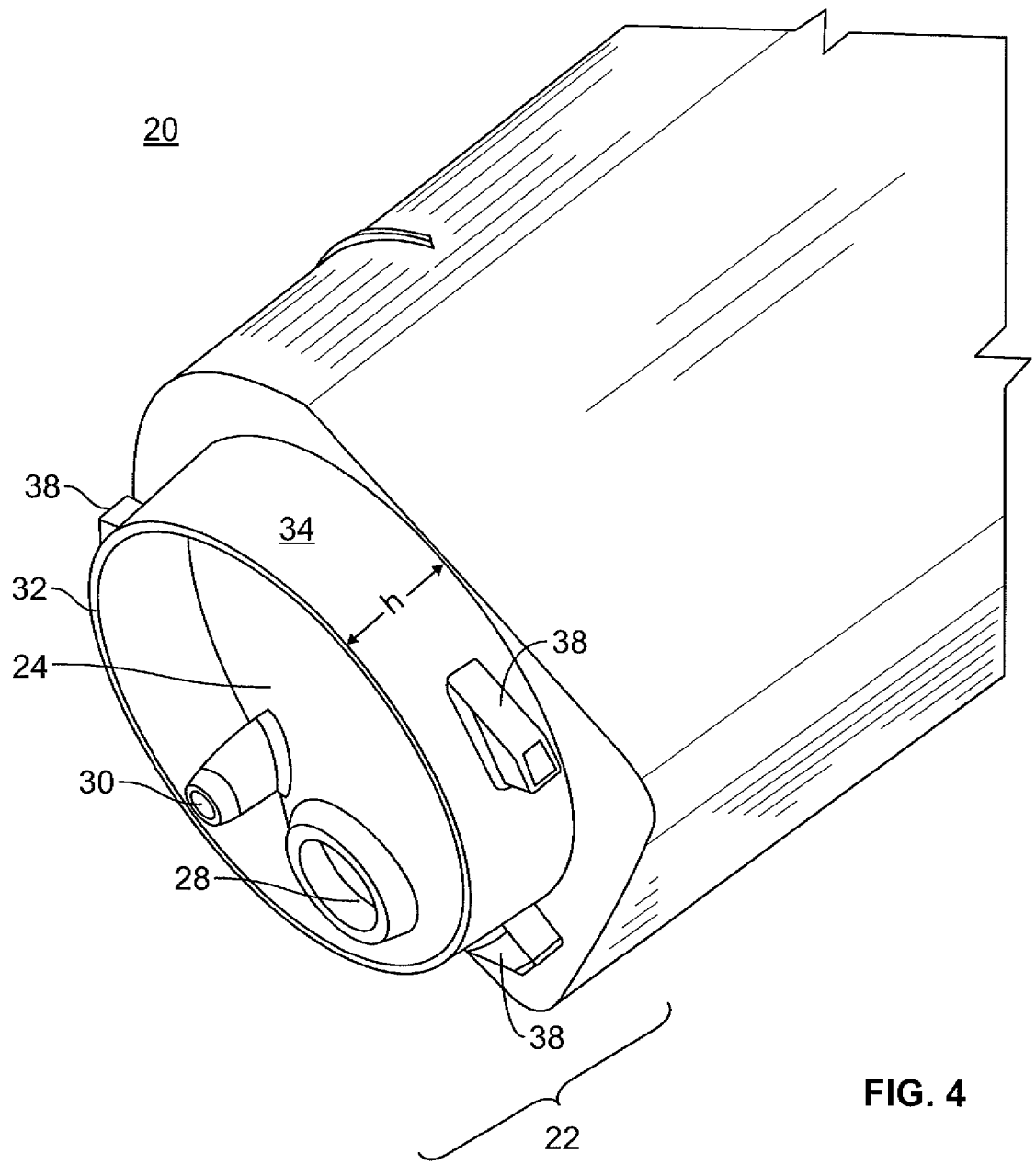
FIG. 4 is a view of the lower portion of the reservoir.

FIG. 4 shows a view of the bottom or "lower portion" 22 of the reservoir 20. The reservoir 20 has a bottom 24 that is sealed, except for a cylinder 26 that extends through the bottom 24 of the reservoir 20 to define a first dispensing hole 28 through which particulates can pass from inside the reservoir into the lower portion 50, not shown in FIG. 4. A spindle 30 formed into and located at the center of the bottom 24 of the reservoir 20 extends downwardly from the bottom 24 of the reservoir 20. The center of the spindle 30 defines an axis of rotation for the reservoir 20 and an axis of rotation for a measuring/dispensing vane 80, not shown in FIG. 4.

The bottom 24 of the reservoir 20 is circumscribed by a cylindrical rim 32 having a height, h. The outer or exterior surface 34 of the rim 32 defines an outer diameter of the rim 32, which is also considered herein to be an outer diameter of the lower portion 22 of the reservoir 20. Engagement tabs 38 extend outwardly from the exterior rim surface 34. The engagement tabs 38 are preferably spaced evenly around the circumference of the cylindrical rim 32 so that the tabs 38 carry substantially equal forces and loads. The engagement tabs 38 are approximately half-way up the height, h, so that the rim 32 adequately engages a mating surface in the base 50, not shown in FIG. 4.

The engagement tabs 38 are sized, shaped and arranged to slide into and engage mating slots 62 in the dispensing base portion 50, not shown in FIG. 4. The cross-sections of the tabs 38 and slots 62 are complementary to each other. The tabs 38 and slots 62 allow the dispensing base portion 50 and the reservoir 20 to be engaged to, and disengaged from each other in order to allow the dispenser 10 to be completely disassembled for cleaning or repair.

The first dispensing hole 28 in the bottom of the reservoir 20 has a diameter that allows particulates in the reservoir 20 to flow freely through the hole 28. Substances that fall through the first dispensing hole 28 fall into the base portion 50 and toward the top 82 of the measuring/dispensing vane 80.

FIGS. 5A-5D are views of a measuring/dispensing vane 80. The vane 80 is generally cylindrical in that it has a circular top 82 and a circular bottom 84 but the side or wall of the vane 80 is formed to have protuberances 91 that enable the vane 80 to be rotated using a person's thumb or finger. The top 82 of the vane 80 is planar except for a centrally located cylinder or hollow axle 86 that extends upwardly from and orthogonal to the top 82 of the measuring/dispensing vane 80. The interior depth of the cylinder/axle 86 and its interior diameter 88 receive the spindle 30 depicted in FIG. 4 that extends downwardly from the bottom 24 of the reservoir 20. The cylinder/axle 86 formed into the top 82 of the vane 80 has a geometric central axis (not shown) about which the vane 80 rotates when the vane 80 is installed into the dispensing base 50, as described more fully below.

The bottom 84 of the vane 80 is planar and parallel to the plane of the top 82 of the vane 80. A second cylinder 87 is formed into the bottom 84 of the vane 80. The depth and interior diameter of the second cylinder 87 receive a second spindle 54 (shown in FIG. 6) that extends upwardly from the bottom 58 of the dispensing base 50. The center of the first cylinder 86 and the center of the second cylinder 87 are coincident. The centers of the two cylinders 86, 87 define an axis of rotation for the vane 80, which is parallel to the center axis of the reservoir 20 and about which the vane 80 rotates.

FIGS. 5A-5D also show that the measuring/dispensing vane 80 has several apertures 90 evenly spaced around the axle 86. The apertures 90 extend all the way through the vane 80. When the vane 80 is installed into the dispensing base 50, the bottom surface 84 of the vane faces the flat bottom of the dispensing base 50. Although the apertures 90 extend all the way through the vane, when the vane 80 is installed in the base portion, the aperture bottoms are effectively closed off by the bottom 58 of the base portion above which the vane rides. The aperture thus defines a fixed volume between the top 82 surface of the vane 80 and the bottom 84 surface of the vane 80.

The vane 80 is formed to have recesses 92, which are accessible through the aforementioned window 52 in the dispensing base portion 50. When viewed from the bottom as shown in FIG. 5B, the recesses 92 resemble truncated cardioids, i.e., a cardioid, that is cut off. The flat surfaces that extend radial from the center of the vane 80 thus effectively define protuberances 91 against which a user's finger can exert force to cause the vane 80 to be rotated in the dispensing base 50.

The vane 80 rotates about a spindle 54 that extends upwardly from the bottom of the base portion 50. The vane 80 also rotates about the spindle 30 that extends downwardly from the bottom of the reservoir 20. The window 52 in the base portion 50 provides access to the recesses 92 and protuberances they form in the vane 80.

As can be seen in FIG. 6 and FIG. 7, the base portion 50 has an open top 59 that is substantially circular and which defines an annular rim surface 60. The interior rim surface 60 is provided with slots 62 that are sized, shaped and arranged to mate and engage corresponding tabs 38 in the exterior rim surface 34 of the lower end 22 of the reservoir 20. When the axis of the reservoir 20 and axis of dispensing base 50 are coincident, the engagement tabs 38 of the reservoir slide into corresponding slots 62 of the dispensing base 30. When the tabs 38 are fully inserted into the slots 62, the reservoir 20 and base 30 are rotated with respect to each other by a few degrees, causing the engagement tabs 38 to travel around the circumference of the inner rim 60 by a few degrees, locking the reservoir 20 to the base 30.

An upwardly extending spindle 54 and a second dispensing hole 56 are formed into the bottom 58 of the interior of the base portion 50. When the dispensing vane 80 is installed into the base portion 50, and when the reservoir 20 is affixed to the top of the base portion 50, the bottom 58 of the base portion 50 closes off the bottom or lower end of the apertures 90 in the vane 80 except when an aperture 90 is over the second dispensing hole 56 in the bottom 58 of the base portion 50. When the reservoir 20 is filled, particulates in the reservoir 20 fall through the first dispensing hole 28 toward the measuring/dispensing vane 80. When an empty aperture 90 in the vane 80 is rotated below the first dispensing hole 28, the hole 90, fills with particulate that passes from the reservoir through the first dispensing hole 28. When aperture 90 is rotated over the second dispensing hole 56, particulate in an aperture 90 that passes over the second hole 56 will fall from the vane 80 through the second hole 56 and out the dispenser 10. Rotation of the vane 80 thus moves an empty aperture 90 under the first hole 28 then over the second dispensing hole 56. Continued rotation of the vane 80 thus causes empty apertures to be filled and causes full apertures to discharge from the second dispensing hole 56.

Experimentation has shown that granules fall onto the bottom 58 of the dispensing base 50. As granules accumulate on the bottom 58 of the base 50, they can interfere with vane rotation. Experimentation has shown that a gasket 94 placed over surfaces of the measuring/dispensing vane 80 will tend to sweep granules around the bottom 58 of base 50 and eventually fall from the second hole 56.

Figure 5A:
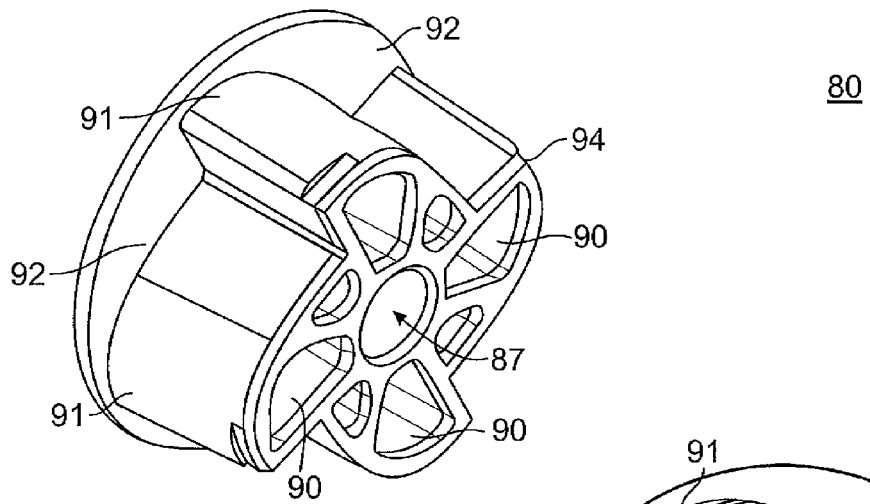
FIG. 5A is a perspective view of the measuring/dispensing vane.
Figure 5B:
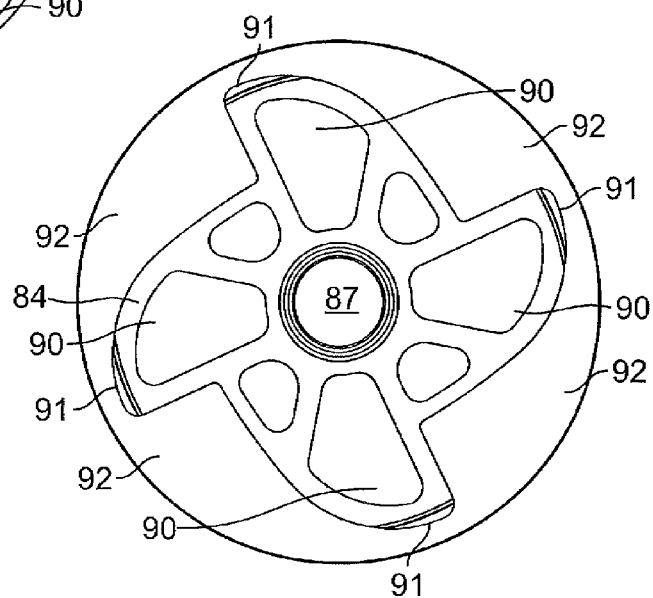
FIG. 5B is a bottom view of the measuring/dispensing vane depicted in FIG. 5A.
Figure 5C:
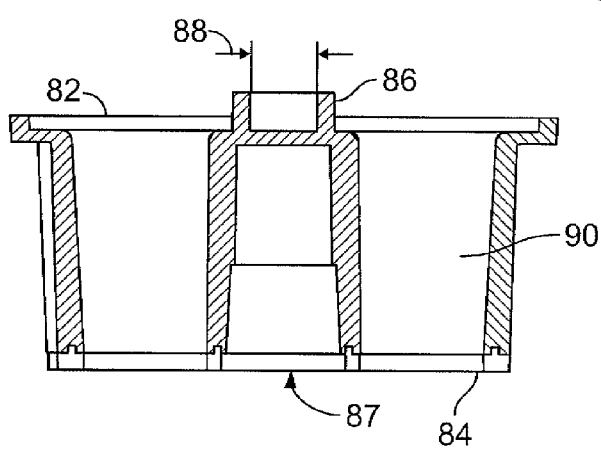
FIG. 5C is a cross-section of the measuring dispensing vane shown in FIG. 5.
Figure 8:
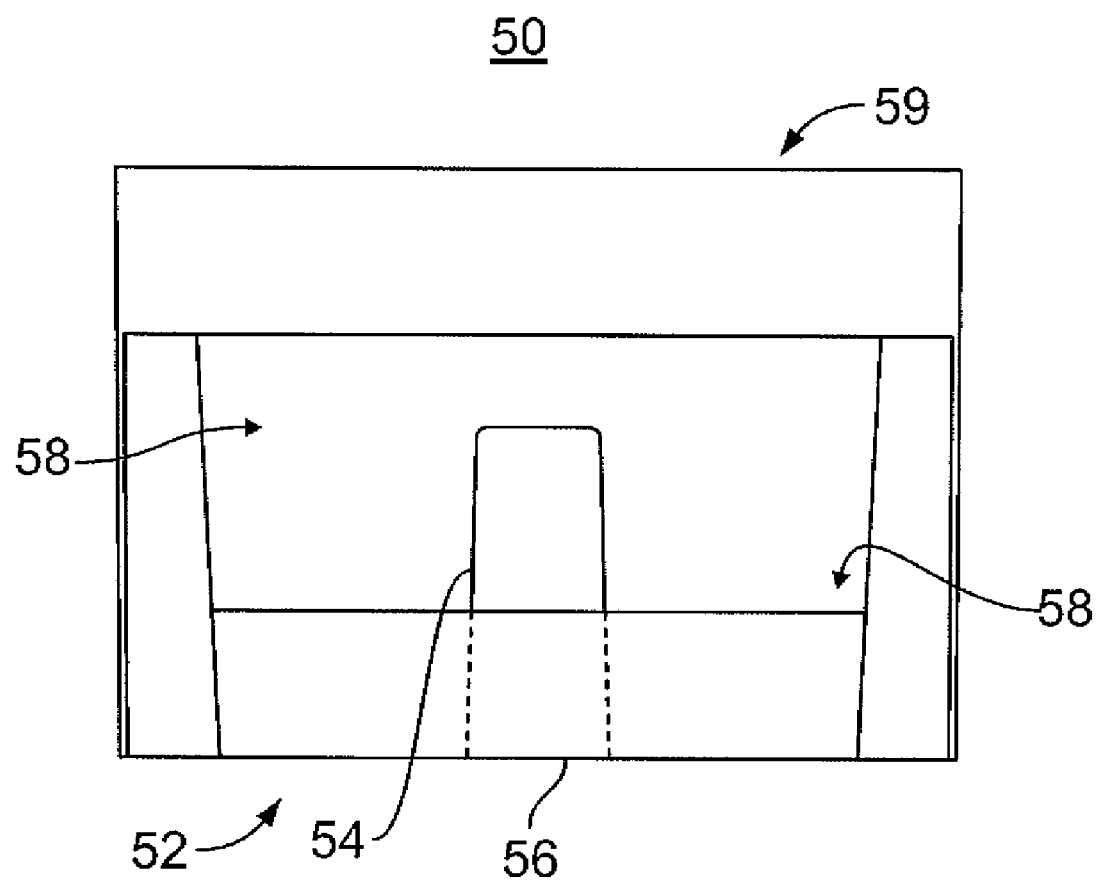
FIG. 8 is a front view of the base portion shown in FIGS. 6 and 7.
Figure 9A:
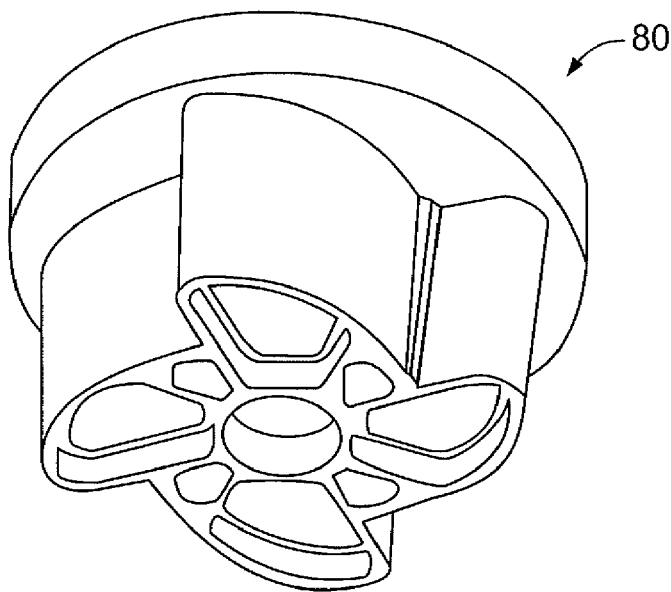
FIG. 9A is a perspective view of the measuring dispensing vane shown in FIGS. 5A-5C.
Figure 9B:
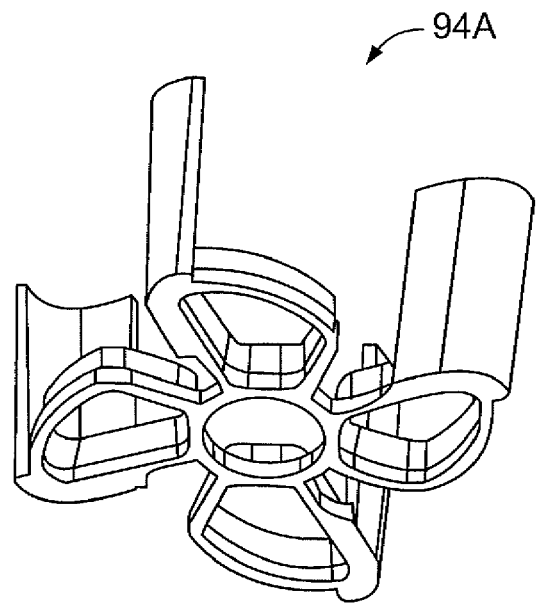
FIG. 9B is a perspective view of an over-molded gasket that fits over the measuring/dispensing vane shown in FIG. 9A.

FIG. 5A shows that the bottom of measuring/dispensing vane 80 is provided with a deformable gasket 94. FIGS. 9A and 9B, however, are views of another embodiment of the measuring/dispensing vane 80 and a mating gasket 94A. In FIGS. 9A and 9B, the gasket 94A shown in FIG. 9 is referred to as "over-molded," which should not be construed as requiring the gasket 94A to actually be molded over the measuring/dispensing vane 80. The gasket 94A shown in FIG. 9B can either be molded over the vane 80 or, molded separately and with a size and shape that conforms to the shape of the vane 80 and thereafter be slipped over the vane 80.

Regardless of which embodiment is used, the material from which the gaskets 94 and 94A are made is soft, with a Durometer, Shore A-scale hardness between approximately 10 and 50 and preferably between about 10 and 30. A rubber band has a Shore A hardness of approximately 30. A pencil eraser has a Shore A hardness of approximately 40. Regardless of the scale used to measure softness or hardness, the gaskets 94 and 94A are of a softness at least as soft as a common rubber band and a common pencil eraser. Stated another way, the gaskets are soft enough to allow them to deform and conform to crystals, like sugar, that fall onto the bottom 58 of the base. As the gaskets rotates with the vane, they will tend to sweep or pick-up crystals but in either case they will prevent crystalline material from accumulating and becoming lodged under the rigid plastic surfaces of the vane 80 as it rotates.

Figure 10:
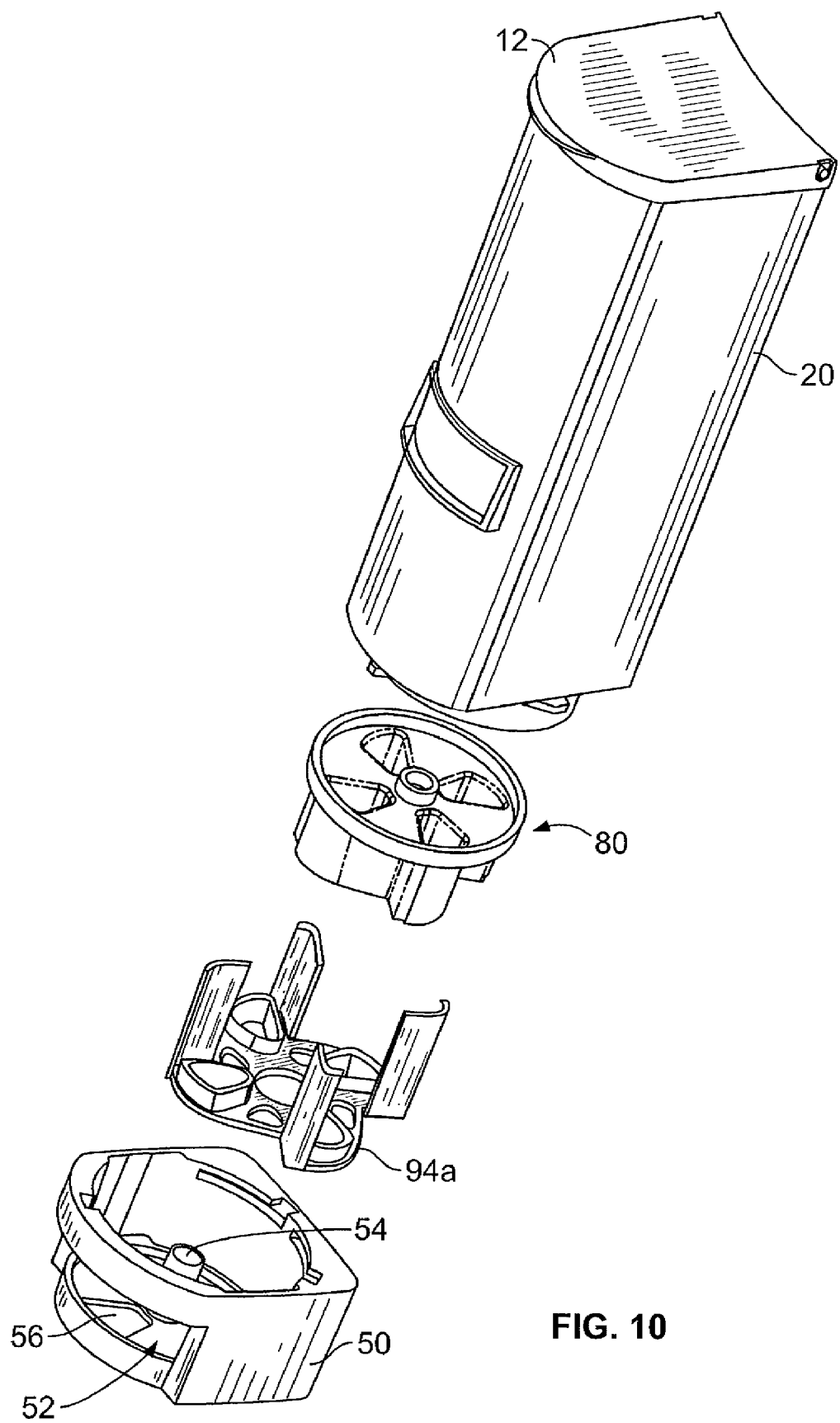
FIG. 10 is an exploded view of the dispenser with the measuring/dispensing vane of FIG. 9A and the gasket of FIG. 9B.
Figure 11:
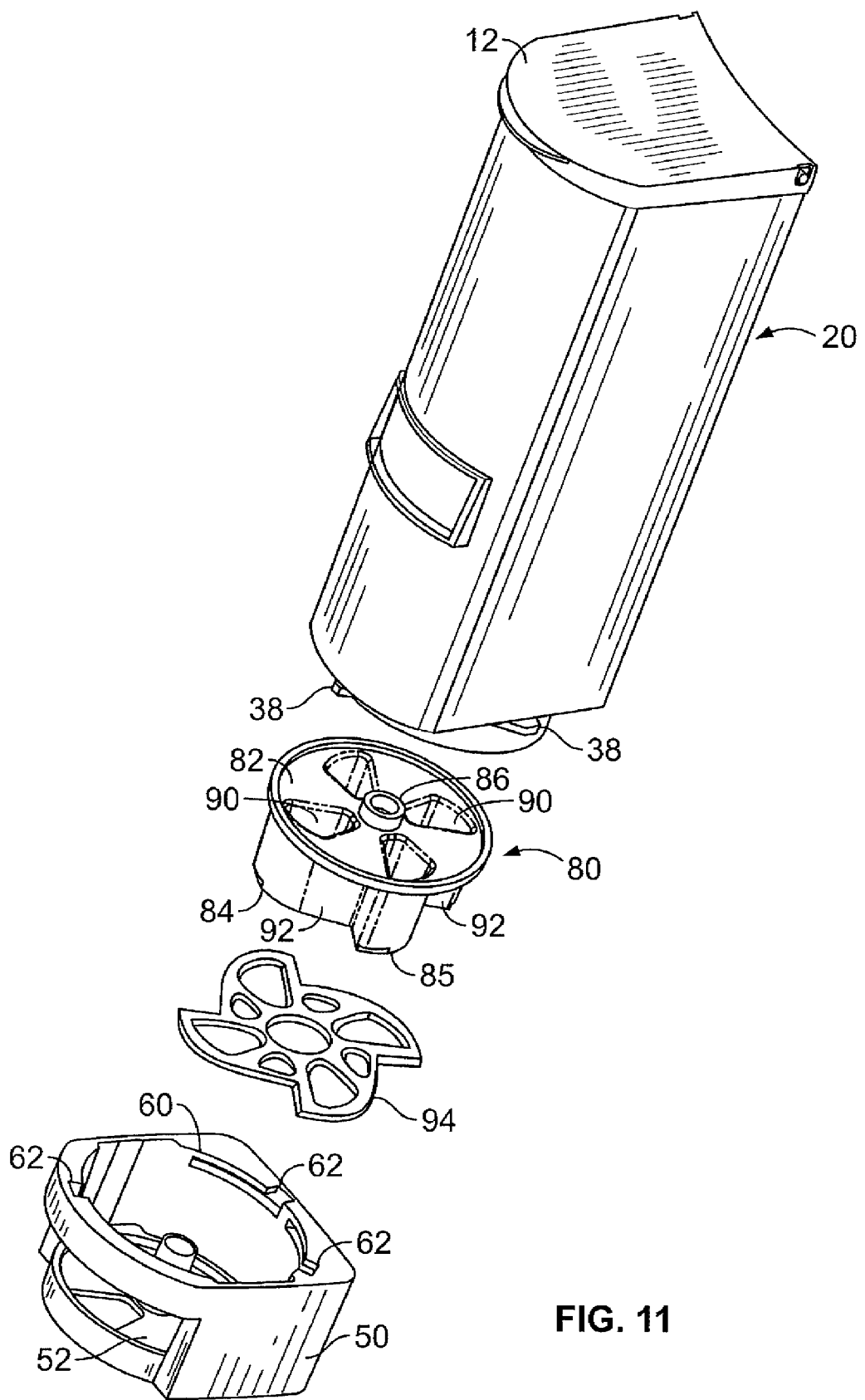
FIG. 11 is an exploded view the dispenser with the measuring/dispensing vane of FIG. 5A.

FIG. 10 is an exploded view of a preferred embodiment of the dispenser 10 showing the reservoir 20, the vane 80 with the over-molded deformable gasket 94A and the base 50. FIG. 11 is an exploded view of an alternate embodiment of the dispenser 10 having the flat deformable gasket 94 shown in FIG. 5A.

While the dispenser embodiments shown in the figures have the engagement tabs formed as part of the reservoir, alternate and equivalent embodiments of the dispensers described above have engagement tabs formed into the dispensing base 50. The slots in such an embodiment are of course formed into the reservoir 20.

The scope of the invention is not defined by the foregoing description but is instead set forth in the appurtenant claims.

What is claimed is:

1. A particulate dispenser comprised of:
   a particulate reservoir having a lower portion with a closed bottom, the lower portion having an exterior rim surface, a geometric center axis and a first hole through the bottom of the lower portion through which particulates can pass;
   a dispensing base portion that encloses a rotating measuring/dispensing vane having an axis of rotation substantially parallel to said geometric center axis, said dispensing base having a bottom above which said measuring/dispensing vane rotates, and an open top defined by an interior rim surface, the interior rim surface mating with the exterior rim surface of the lower portion of the particulate reservoir, said dispensing base portion having a second hole through the bottom of the dispensing base portion through which particulates can pass;
   an engagement tab extending outwardly from at least one of:
      the exterior rim surface; and
      the interior rim surface;
   a slot, sized, shaped and arranged to receive said engagement tab, said slot being formed in at least one of:
      the interior rim surface; and
      the exterior rim surface;
      the engagement tab and slot cooperating to removably attach the reservoir to said dispensing base portion by the insertion of said exterior rim surface into the interior rim surface and insertion of said engagement tab into said slot followed by a rotation of the base portion relative to the reservoir;
   wherein said measuring/dispensing vane is comprised of a plurality of apertures arranged in a circle around the vane's axis of rotation;
   wherein said measuring/dispensing vane is comprised of upper and lower planar surfaces orthogonal to said vane's axis of rotation, said lower planar surface of said vane being provided with a deformable gasket that rides on said planar bottom surface of said dispensing base portion.

2. The particulate dispenser of claim 1, wherein the deformable gasket is constructed of a material that deforms in response to particulates.

3. The particulate dispenser of claim 1, wherein the deformable gasket is constructed of a material having a Durometer Shore A scale hardness between approximately 10 and 50.

4. The particulate dispenser of claim 1 wherein said measuring/dispensing vane includes a plurality of recesses formed into the perimeter of the measuring/dispensing vane and wherein said dispensing base portion has a window formed therein through which a finger can be inserted.

5. The particulate dispenser of claim 4 wherein the engagement tabs have a cross section with a predetermined shape and wherein the slots have a mating complementary shape.

6. The particulate dispenser of claim 4 wherein the reservoir has an open top and wherein the dispenser further includes a cover for said open top, said cover being operable to allow particulate to be provided into said reservoir.

7. The particulate dispenser of claim 4, wherein said dispensing base portion encloses and conforms to the diameter of the substantially cylindrical rotating measuring/dispensing vane.

8. The particulate dispenser of claim 7, wherein said measuring/dispensing vane has an upper surface and a lower planar surface, both of which are orthogonal to said measuring/dispensing vane's axis of rotation, said measuring/dispensing vane having a soft deformable gasket.

9. The particulate dispenser of claim 8, wherein said exterior rim surface is provided with a plurality of engagement tabs extending outwardly from the exterior rim surface and wherein said dispensing base is formed to have a plurality of slots integrally formed into the dispensing base, each slot of said plurality of slots being sized, shaped and arranged to receive a corresponding engagement tab on said exterior rim surface.

10. The particulate dispenser of claim 9 further including a cover for said open top, said cover being openable to allow particulate to be provided into said reservoir.

11. The particulate dispenser of claim 9, wherein said dispensing base portion encloses and conforms to the diameter of the substantially cylindrical rotating measuring/dispensing vane.

12. A particulate dispenser comprised of:
    an elongate particulate reservoir portion having an open top and a circular closed lower portion defined by a cylindrical exterior rim surface of said circular closed lower portion, said cylindrical exterior rim surface having a length and an outside diameter, said circular closed lower portion including a first particle dispensing hole that is located on a first radius of said circular closed lower portion;
    an openable cover for said open top;
    a dispensing base portion that encloses a rotating measuring/dispensing vane having an axis of rotation that is collinear with said geometric center axis and about which said measuring/dispensing vane rotates, said dispensing base having a substantially circular planar interior bottom surface above which the measuring/dispensing vane rotates, said dispensing base portion having a circular open top above the vane that defines a cylindrical opening centered on said first geometric axis that mates with the cylindrical exterior rim surface, the cylindrical opening of said dispensing base portion having a cylindrical interior surface sized, shaped and arranged to receive the exterior rim surface of said elongate particulate reservoir, said planar interior bottom of said base portion having a second hole centered on a second radius;
    said measuring/dispensing vane comprised of a plurality of apertures arranged in a circle around the vane's axis of rotation such that rotation of said vane rotates about its axis locates a first aperture under said first hole, further rotation of said vane causes the first aperture to pass over said second hole through which particles in the first aperture can pass, said measuring/dispensing vane having a circular lower planar surface attached to which is a deformable gasket that rides on said lower planar surface and seals particles in said apertures as said vane rotates;
    said measuring/dispensing vane further including a plurality of recesses formed into the perimeter of the measuring/dispensing vane and wherein said dispensing base portion has a window formed therein through which a user's finger can be inserted to engage a recess and exert a rotational force on said measuring/dispensing vane;
    a plurality of engagement tabs on at least one of:
       the exterior rim surface; and
       the interior rim surface;
    a plurality of slots that accept said plurality of engagement tabs, said plurality of slots on at least one of:
       the interior rim surface; and
       the exterior rim surface;
    such that the engagement tabs slide into corresponding slots, the engagement of said engagement tabs with said slots removably attaching the particulate reservoir portion to said dispensing base portion.

* * * * *